Oct. 21, 1952 — O. H. LOOCK — 2,614,326
MOLD TRIMMER
Filed Oct. 13, 1949
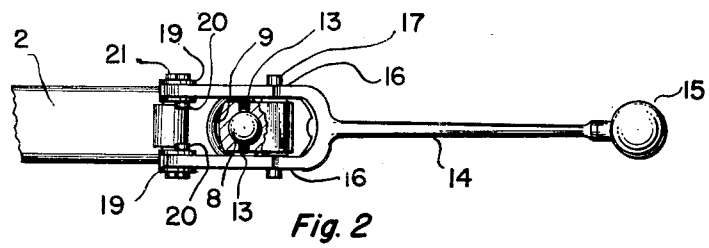
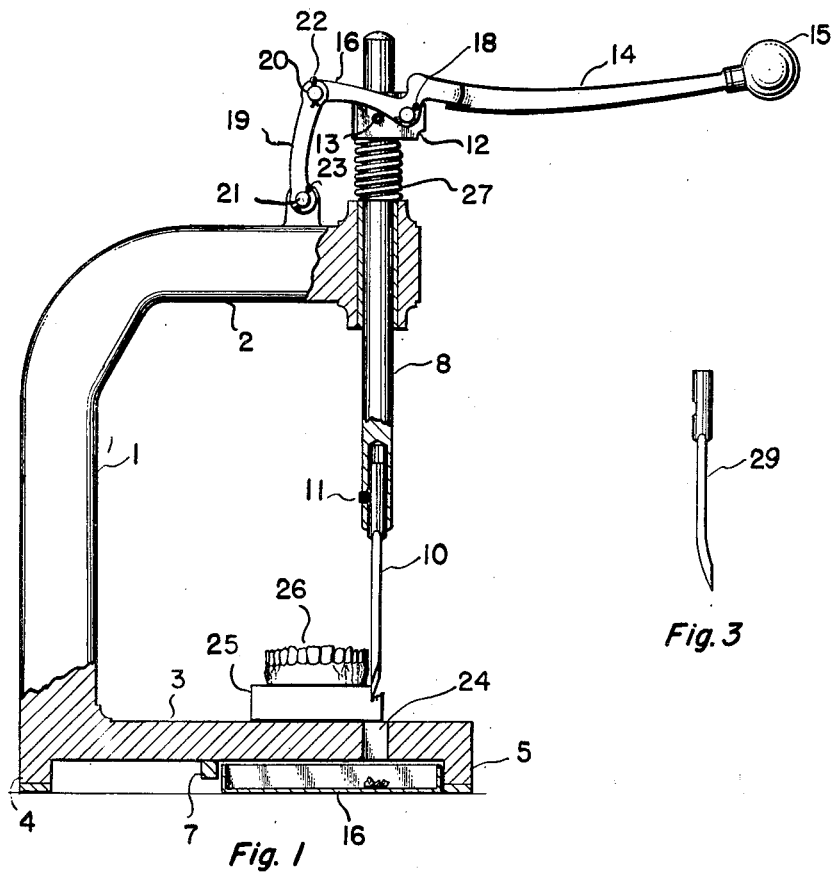
INVENTOR.
Oscar H. Loock
BY Ransele O Wyatt
Attorney Patented Oct. 21, 1952

2,614,326

UNITED STATES PATENT OFFICE 2,614,326

MOLD TRIMMER

Oscar H. Loock, Houston, Tex.

Application October 13, 1949, Serial No. 121,160

2 Claims. (Cl. 32—38)

This invention relates to a new and useful mold trimmer.

An object of this invention is to provide a mold trimmer for trimming the plaster of Paris, or the like, mold from a molded article.

In making dentures, the plaster of Paris mold in which the denture is encased must be removed after the mold has been baked, and this plaster of Paris is very hard. The present method of removing this mold from the denture is by breaking it off by hand with a hammer, which constitutes a time consuming and tedious task. This method often results in inadvertently striking the denture, breaking the acrylic plastic or rubber tooth holder, or breaking a tooth. It is an object of this invention to provide a mold trimmer that will quickly and easily remove the plaster of Paris without danger of damaging the denture and in a fraction of the required time when the task is done with a hammer.

With the above and other objects in view, the invention has more particular relation to certain novel features of construction and operation described in the following specification and illustrated in the accompanying drawings, wherein:

Figure 1 is a side elevational view, partly in section.

Figure 2 is a top view of the view shown in Figure 1, and

Figure 3 is a side elevational view of another form of cutting tool to be used in the device.

In the drawing the numeral 1 indicates a frame having an overhanging arm 2 and an outwardly extended platform 3 integral therewith. The platform 3 has legs as 4, 5 and a debris receptacle as 6 mounted on the underside of said platform 3.

A tool holder 8 extends through a suitable port as 9 in said arm 2 and a tool as 10 is mounted in the lower end of said holder as by the set screw 11. Mounted on the upper end of said tool holder 8 is the adjustable lever block 12 which is maintained in the desired position on the holder by means of the Allen screws 13, 13. The operating lever 14 has the hand knob 15 at its outwardly extended end and the offset fork members 16, 16 at its other end. The fork members 16, 16 embrace and are pivotally mounted on the block 12 by means of the pin 17 which is maintained in locked position as by the cotter key 18. The outwardly extended ends of the fork are pivotally secured to one end of the links 19, 19 as by means of the pins 20, 20, and which are secured at their other ends to the pin 21, which is pivotally mounted on the arm 2 of the frame 1. The pins 20, 21 are locked in position as by the cotter keys 22, 23.

A port as 24 extends through the platform 3, through which the chippings from the plaster mold 25 may be dropped into the debris receptacle 6.

After the denture, as 26, has been baked and removed from the retaining flasks (not shown), the mold is placed on the platform beneath the tool 10, and the operator moves the tool downwardly by depressing the lever 14. The mold 25 is thus trimmed away from the denture 26, the operator moving the mold after each cut to the next desired position. As the thickness of the plaster of Paris is reduced by trimming, the mold will weaken and readily break up. If, however, plaster of Paris remains in the crevices of the dentures, as inside the tooth arc, a tool as 29 is shown in Figure 3, which may be substituted for the tool 10, to cut out the plastic inside such crevices. Of course, it is apparent that many types of working tool may be substituted for the tool 10 as desired by the operator of the device. A coil spring, as 27, is provided between the block 12 and the arm 2, to urge the tool constantly into raised position.

The embodiments of the invention herein shown and described are to be regarded as illustrative only and it is to be understood that the invention is susceptible to variation, modification and change within the scope of the appended claims.

What I claim is:

1. In a dental mold trimmer, a framework, a base member on said framework forming a working platform, an upstanding member integral with said platform having an outwardly extended supporting arm, a bearing member formed in the end of said supporting arm, a piston freely operable in said bearing member, means adjacent said bearing member yieldably urging said piston constantly into raised position, a cutting tool attached to the lower end of said piston and a manually operable outwardly extending lever, a block on said piston providing means for anchoring said lever to said piston, said lever being pivotally anchored adjacent one end to the said block and a link pivotally connected at one end to said supporting arm and at the other end to the extended end of said lever.

2. In a mold trimmer, a framework, the bottom portion of said framework forming a work platform, an upstanding arm extending from said platform and an outwardly extended arm on the upper end of said upstanding arm having a vertical bearing at the extended end thereof, a tool holding rod extending through said bearing and adapted to be moved vertically therein, a tool holding socket in the lower end of said rod, a vertically adjustable lever block on the upper end of said rod, a pivotally connected link mounted on said outwardly extended arm, a forwardly extended lever pivotally anchored to said lever block and to said link, means on said rod adjacent said bearing for urging the rod constantly into one position.

OSCAR H. LOOCK.

REFERENCES CITED

The following references are of record in the file of this patent:

UNITED STATES PATENTS

| Number | Name | Date |
|---|---|---|
| 262,494 | Sternberger | Aug. 8, 1882 |
| 788,295 | Weixler | Apr. 25, 1905 |
| 1,354,089 | Callsen | Sept. 28, 1920 |
| 1,805,546 | Howlett | May 19, 1931 |
| 2,260,972 | Gundlach | Oct. 28, 1941 |

FOREIGN PATENTS

| Number | Country | Date |
|---|---|---|
| 727,135 | France | Mar. 21, 1932 |